July 6, 1937.  A. TAUB  2,086,370
ENGINE MOUNTING
Filed Dec. 15, 1932   3 Sheets-Sheet 1

Inventor
Alex Taub
By Blackmore, Spencer & Flint
Attorneys

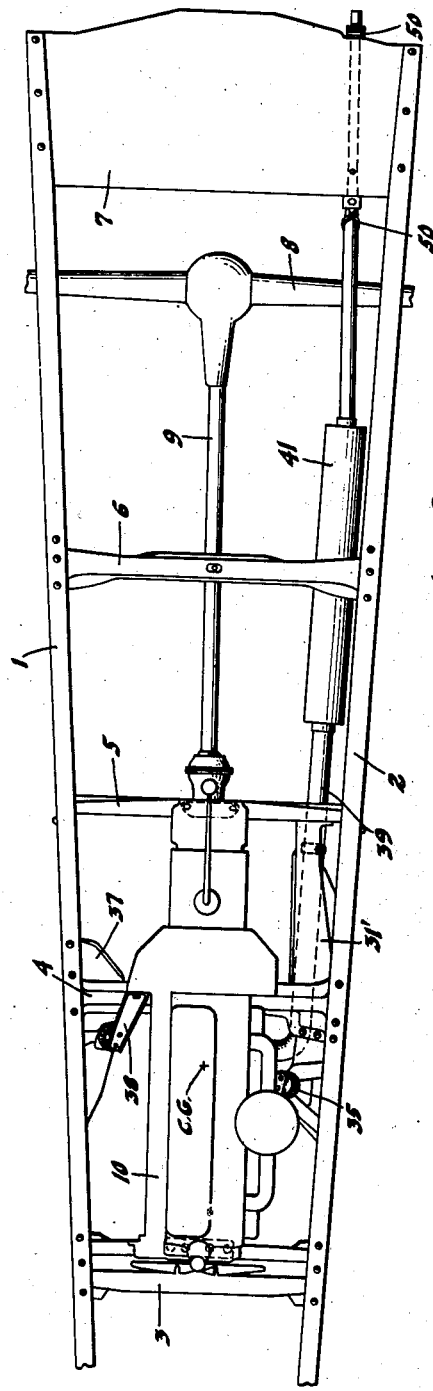

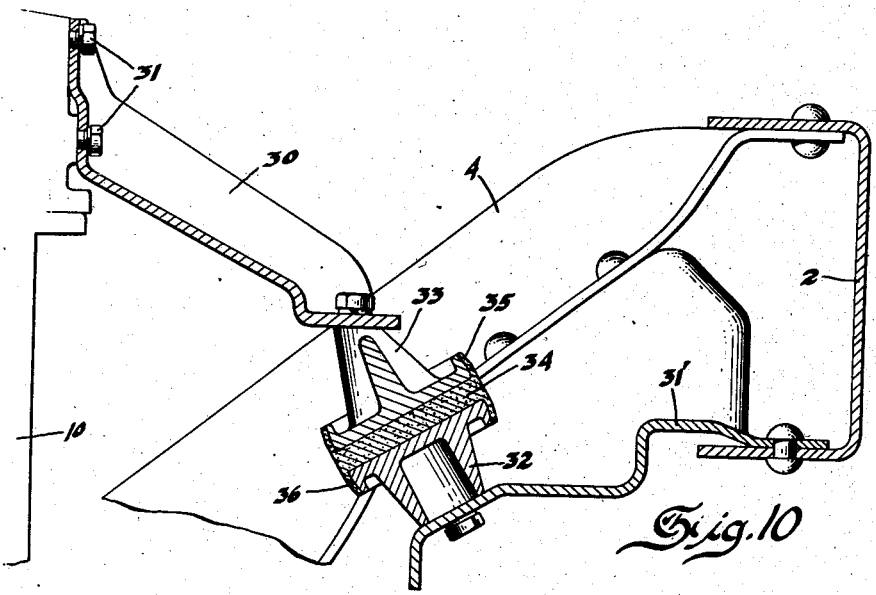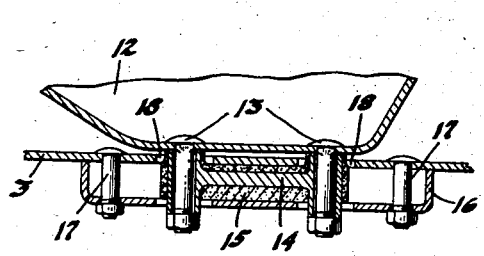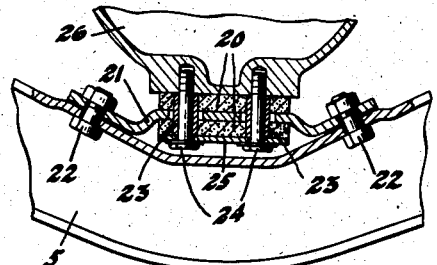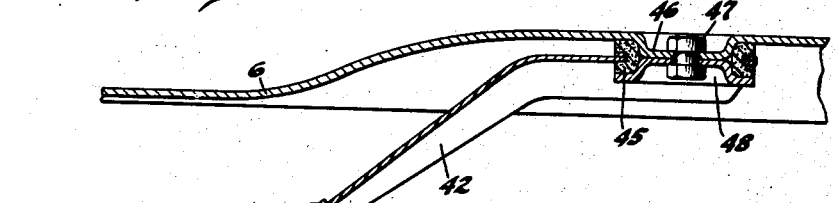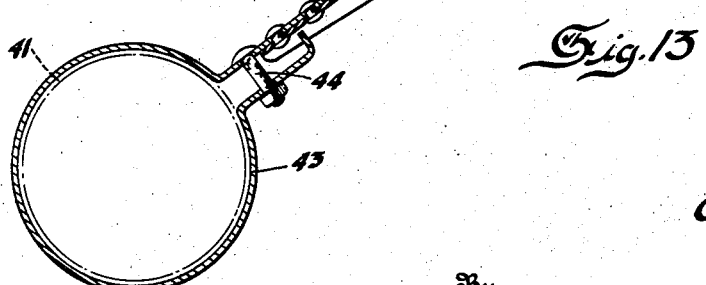

Patented July 6, 1937

2,086,370

UNITED STATES PATENT OFFICE 2,086,370

ENGINE MOUNTING

Alex Taub, Detroit, Mich., assignor to General Motors Corporation, Detroit, Mich., a corporation of Delaware Application December 15, 1932, Serial No. 647,343

7 Claims. (Cl. 248—7)

This invention has to do with the mounting of engines or other bodies which are subject to vibration.

Unbalance of moving parts, unequal power impulses, combustion roughness and engine torque reactions are among the dominant causes of engine vibration. Experiments indicate that the vibratory forces tend to oscillate the engine about its center of gravity. If this be true, then theoretically at least the logical thing to do to eliminate the transmission and effect of engine vibrations is to mount the engine at its center of mass. From a practical standpoint this has not been found feasible, but it is possible to accomplish substantially the same results if the engine is properly mounted with relation to its center of gravity so that the engine in response to vibratory forces is free to oscillate in any direction about the center. In principle, the engine could be located within a sphere whose center coincides with the center of gravity of the assembly, with a mating socket to embrace the sphere and afford a ball and socket arrangement to permit free relative oscillations in all directions. For insulation purposes and to offer resilient restraint against excessive relative movement and cushion the vibratory forces, use could be made of rubber or other elastic non-metallic material between opposed surfaces of the ball and socket parts.

Figure 1:
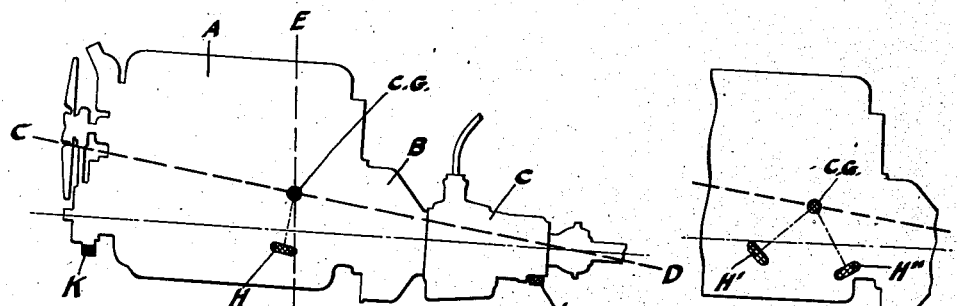
Figure 5:
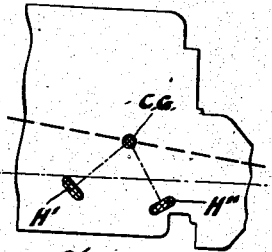
Figure 2:
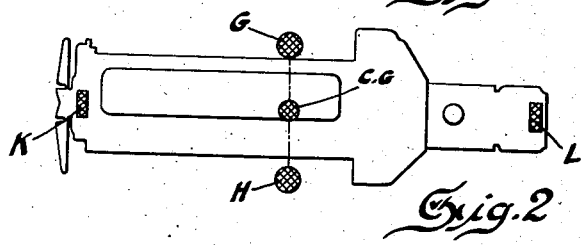
Figure 6:
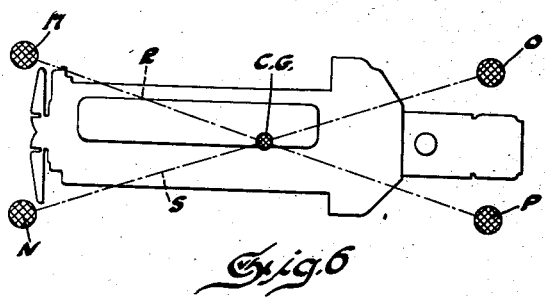
Figure 7:
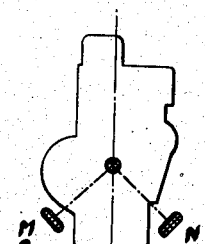

An adaptation of this principle is embodied in the construction here involved, as illustrated in the accompanying drawings, wherein Figure 1 is a side elevation of a power plant illustrating diagrammatically a satisfactory arrangement for mounting an engine to prevent the transmission of vibrations to its support. Figure 2 is a top plan view, and Figure 3 an end view diagrammatically illustrating the arrangement of Figure 1. Figure 4 is a top plan diagrammatic view illustrating an alternative embodiment of the invention. Figure 5 is a fragmentary side elevation showing the structure of Figure 4. Figure 6 illustrates diagrammatically a modified embodiment, which is also shown in the elevational view, Figure 7. Figure 8 is a top plan view of an engine mounted in the chassis frame of a motor vehicle. Figure 9 is an elevational view of the parts shown in Figure 8. Figure 10 is a vertical sectional view of one of the weight supporting elements between the engine and chassis frame. Figures 11 and 12 are detail sectional views, respectively, illustrating tie connections which have been found satisfactory for attaching the front and rear of the engine to the chassis frame; and Figure 13 is a detail sectional view illustrating the mounting for a part of the engine exhaust system.

Figure 3:
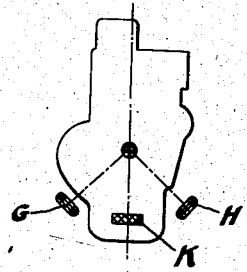
Figure 4:
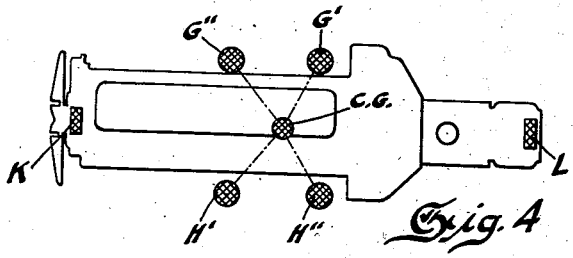

Referring to the diagrammatic views, Figures 1, 2 and 3, the unitary power plant illustrated, includes a multiple cylinder internal combustion engine A, a clutch B and a change speed transmission C with the power output side of the transmission being arranged for connection with a driving axle. The center of gravity of this assembly is indicated by the letters CG, and it is about this point CG that the engine tends to oscillate. The direction of oscillations differs under different sets of conditions, such as relative out of balance of the moving parts, changes in speed and load, and the differences in power output from the several cylinders, as well as the functioning of the individual cylinders, depending upon the character of the internal combustion. For example, at times the engine may tend to oscillate about a longitudinal axis, while at other times the axis extends in a vertical direction. Thus, the low speed vibration may be about a downwardly inclined longitudinal axis indicated by the broken line CD, while at higher speeds the axis may be that indicated by the vertically extending broken line EF, both lines, however, intersecting the point CG. With this in mind it is proposed to carry the static load of the engine at one or more points on the frame or support through attaching connections or mountings preferably of a resilient nature. A satisfactory mounting may be provided by interposing a pad of rubber or other similar material between opposed surfaces associated with the engine and frame respectively. These opposed surfaces may define arcs struck from the center of gravity or may be short flat surfaces which are tangent to a circle whose center is on the center of gravity. Tangential surfaces are satisfactory inasmuch as the rubber is sufficiently sensitive to accommodate the forced movement, and for the same reason it is not necessary that a line drawn normal to the plane of the opposed surfaces exactly intersect the center of gravity. Two of such weight supporting connections are illustrated in Figures 1, 2 and 3, at G and H, respectively, these being located on opposite sides of the engine and in the transverse plane which includes the center of gravity. They are also spaced equal distances from the point CG in which case the resiliency of the rubber pads should be identical to give a balanced effect.

Since the rubber interposed between the opposed surfaces in each instance extends in a plane substantially normal to a straight line which the support and the point about which the engine tends to oscillate, it will be apparent that it will readily yield to accommodate the movement in any direction of oscillation and at the same time and depending upon its degree of resiliency offer suitable elastic restraint to cushion the vibratory forces.

To prevent excessive rocking of the engine about its points of support upon the application of external forces, such as driving or braking torque of the driving axle without disturbing the action of the weight supporting connections, it is proposed to provide one or more tie connections between the engine and frame, preferably located at either or both the front and rear of the engine as is illustrated at K and L. These auxiliary connections also preferably include non-metallic deformable material, such as rubber, which is made sufficiently soft to freely yield in all directions to accommodate the engine vibrations and they are relieved from the dead weight of the engine by the weight supporting parts before referred to.

Instead of having the weight supporting connections diametrically opposite each other in a transverse plane, these parts may be positioned diagonally so long as they are in a plane which includes the center of gravity so as to carry substantially the entire load. For example, the mountings can be shifted to the positions G' and H' of Figure 4, and if desired, an additional set of mountings G'' and H'' may be employed. In any event the several mountings will extend in planes substantially normal to a line which approximately intersects the point CG as is illustrated in Figure 5. If four of such mountings are employed, as illustrated in Figure 4, and so located as to be so close to the center of gravity that external forces might produce an adverse effect, it will be desirable to use the auxiliary connections K and L before referred to. However, these auxiliary ties can be wholly eliminated by spacing the connections at a greater distance from the center of gravity, as for example, at the front and rear of the engine as is illustrated in Figure 6. In Figure 6, a pair of mountings M and N are located at the front of the engine and a corresponding pair of connections O and P at the rear, and these several parts are so located that the vertical plane indicated by the broken line R and containing the mountings M and P also includes the center of gravity CG, while the mountings N and O are in the plane S, which likewise intersects the center of gravity CG. Here again the opposed surfaces on the engine and frame should extend in planes tangent to circles whose centers substantially coincide with the center of gravity, but in order to get a balanced action it is necessary that the rubber in the front mountings M and N be relatively softer than that in the rear mountings O and P, inasmuch as the front mountings are farther from the point CG and the mechanical advantage present must be compensated for. This can readily be done by selecting the proper grade of rubber for the respective mountings so that in the complete assembly the resistance offered at each mounting point to the vibratory forces will be balanced with respect to each other.

In Figures 8 and 9 is shown an embodiment of the invention as it is incorporated in the 1933 Chevrolet automobile. Here the chassis frame includes a pair of longitudinal frame members 1 and 2 connected at spaced intervals by transverse bars 3, 4, 5, 6 and 7. This chassis frame is flexibly supported upon front and rear axles in the usual fashion, the rear or driving axle 8 having associated therewith the third member or torque tube 9, which extends forwardly and is connected through a universal joint with the output side of the engine 10. At the front and rear of the engine are located the tie connections with the frame members 3 and 5, the front connection being illustrated in the detail view, Figure 11, and the rear connection in the detail view, Figure 12.

Referring to Figure 11, the numeral 12 indicates the timing gear casing at the front of the engine to which is secured by a pair of studs 13 a forging 14 of substantially H shape section with enlarged heads at opposite ends through which the studs 13 pass. Filling the space within the top and bottom cavities of the H shaped member 14 and completely covering the exterior of the apertured heads, is a mass of rubber 15, preferably vulcanized to the forging 14 and in contact at the top and bottom with the horizontal flange of the cross member 3 and a retainer casing 16, rigidly secured to the cross member 3, by studs 17. If desired the rubber may also be vulcanized to the casing 16 so that the forging 14 and the casing 16 are joined as an integral unit by the mass of rubber 15. Both the cross member 3 and the casing 16 are provided with alined openings 18, to receive the heads on opposite ends of the forging 14 and are of sufficient size to permit ample space for relative lateral movement against the elasticity of the rubber 15 between the forging rigidly mounted to the timing gear cover 12 and the casing 16 rigidly secured to the frame member. This rubber should be sufficiently soft to permit lateral movement and still hold the engine substantially stable. The rear mounting, as shown in Figure 12 includes a pair of rubber pads 20 preferably vulcanized on opposite sides of a plate element 21, which may be secured to the cross member 5 by fastening bolts 22—22. Extending through the pads and enlarged openings in the plate 21 are a pair of spacer tubes 23 through which extend attachment bolts 24 for securing a retainer plate 25 in fixed relation to the housing 26, forming a part of the engine unit. This retainer plate 25 and the spacers 23 may be integrally bonded to the rubber.

Supporting the gravity weight of the engine and freeing both the front and rear tie connections from any static load are a pair of resilient mountings, located on opposite sides of the central longitudinal axis and adjacent the center of gravity of the power plant. In the case of the mounting on the left-hand side of the engine there is involved a bracket arm 30, as shown in Figure 10, secured by a series of four bolts 31 to the engine crank case. This arm projects laterally from the engine and is fastened through a resilient connection with the chassis frame, which for this purpose is provided with an auxiliary or sub-frame 31' extending inwardly of the frame member 2 and connected with both the frame members 4 and 5. This sub-frame in addition to carrying the weight of the engine serves to strengthen the main frame. The flexible mounting unit preferably consists of two forgings 32 and 33, secured respectively by suitable bolts or the like to the sub-frame 31' and the engine arm 30, with adjacent faces of the two forgings having interposed therebetween and preferably vulcanized thereto a pad of rubber 34, which includes as an integral part thereof circular flanges 35 and 36, surrounding the periphery of the adjacent bearing surfaces on the parts 32 and 33. As explained above, the opposed surfaces with the rubber pad 34 therebetween extend in planes so related to the center of gravity that the general direction of the rubber corresponds to the direction of engine oscillation.

The same type of mounting may be applied on the right-hand side of the engine with the lower forging element secured to a sub-frame member 37, and the upper mounting element secured to an arm 38, which may be bolted or otherwise secured to the front face of the flywheel housing. It will be noted that while the two mounting units are not in a plane at right angles to the engine center line, that they are arranged substantially diametrically opposite the center of gravity indicated by the letters CG in Figure 8, so that the entire load is divided between the two mounting elements. As before indicated, the relative location of the weight supporting parts is immaterial so long as they extend in a general direction substantially tangent to a circle whose center is on the center of gravity, although the elasticity of the rubber will not necessitate extreme accuracy in so locating the parts to insure an exact tangential relation. For example, it has been found that smooth operation is had when the opposed surfaces are inclined horizontally at an angle of substantially thirty degrees. With the mountings so arranged the static load is so carried that the initial distortion of the rubber does not materially affect the elastic resistance in any particular direction so that the forces are cushioned to the same extent in all directions.

In the case illustrated, the diagonal alinement of the mounting units was selected because of the interference to a transverse alinement offered by the exhaust pipe connection with the engine exhaust manifold. With reference to the exhaust system which is usually rigidly fastened to the engine and extends a considerable distance rearwardly thereof to the back of the vehicle, it will be found desirable to so suspend the system from the frame that no bad effects will disturb the ability of the mountings to accommodate engine oscillations. For this purpose, it is proposed to hang the exhaust pipe 39 adjacent its forward end by means of coil springs 40 from the sub-frame 31, such springs supporting the weight while freely accommodating any swinging movement of the tail pipe along with engine oscillation. The muffler or silencer 41 which is associated with the exhaust pipe 39 is preferably hung from the transverse frame member 6 by means of a supporting arm 42 having secured at its free end one end of a clamp ring 43, which surrounds the muffler and is provided with a clamping stud 44. The opposite end of the arm 42 is provided with an enlarged aperture of circular or oblong formation and the edges of the opening are received within an annular groove of a cushioning ring 45 which sets against and surrounds a boss 46 in the frame member 6, and has secured thereto by means of a bolt 47 a retainer cap 48 for the cushioning ring. The boss 46 is preferably positioned at or adjacent the longitudinal center line of the chassis frame and the cushioning ring 45 is sufficiently resilient that the lever arm 42 carrying the silencer, in addition to being insulated from the frame, is allowed limited movement to accommodate forced movement of the exhaust system with the engine. Additional mountings may be provided for the tail pipe 49 as illustrated in Figure 9, where two spaced straps 50 are provided, each of which clamps the tail pipe at one end and is mounted at its opposite end between a pair of rubber washers secured by suitable bolts to the frame member 7.

I claim:

1. In combination with an engine having a tendency to oscillate in different directions but always about its center of gravity and a support for the engine, of a pair of resilient connections between the engine and frame, arranged in a vertical plane substantially intersecting the engine center of gravity, and spaced unequal distances from said center of gravity, one of said connections having a higher degree of resiliency than the other.

2. In combination with an engine having a tendency to oscillate in different directions but always about its center of gravity and a support for the engine, of means to mount the engine in the frame to accommodate said oscillations under resilient restraint including two resilient connections on opposite sides and in the vertical plane of the engine center of gravity and at different distances from said center of gravity with the closest connection of comparatively less resilience to compensate for the shorter leverage and effect a balanced action.

3. In combination with an engine having a tendency to oscillate in different directions but always about its center of gravity and a support for the engine, of means to mount the engine in the frame to accommodate said oscillations under resilient restraint, including two pairs of resilient connections located forwardly and rearwardly respectively of the center of gravity, with the left forward and right rearward connections in a vertical plane substantially intersecting the center of gravity and the right forward and left rearward connections in a common vertical plane substantially intersecting the center of gravity, one pair of connections being spaced farther from the center of gravity than the other pair and relatively more resilient to offset the additional mechanical advantage resulting from such unequal spacing.

4. In a motor vehicle, a chassis frame, a variable speed power plant unit having a crank shaft to receive power impulses, and having an inherent tendency to oscillate about different axes through its center of mass above the crankshaft in accordance with varying operating conditions, mounting means between the power plant unit and frame located intermediate the ends of the power plant unit to carry the entire gravity weight of the power plant unit, and constructed and arranged to permit the inherent oscillations of the power plant unit in all directions about its center of mass, and a yieldable tie connection between the power plant unit and the frame adjacent an end of the unit for restraining excessive relative longitudinal rocking movement on the intermediately disposed mounting means under external forces.

5. A mounting for an internal combustion engine including a frame structure, means on said frame structure sustaining substantially the entire weight of said unit and oscillatively supporting the latter for movement about its center of gravity on any axis, said means including yieldable supports located intermediate the ends thereof, and coacting members on said frame structure and engine adjacent an end thereof including opposed faces having yieldable means therebetween adapted to limit longitudinal rocking movement of said engine relative to said frame structure.

6. A mounting for a power unit including an internal combustion engine; and means for oscillatively mounting said unit about the center of mass of said unit, said means comprising a frame structure, a pair of front mounting members, one interposed between the latter and each side of said unit respectively, and each having a rubber element secured to said frame structure and power unit and constructed and arranged to extend in a plane substantially normal to a line intersecting the center of mass of said unit for accommodating oscillatory movement of said unit mainly in shear, and a pair of rear mounting members, one interposed between said frame structure and each side of said unit respectively and each having a rubber element secured to said frame structure and power unit and constructed and arranged to extend in a plane substantially normal to a line intersecting the center of mass of said unit for accommodating oscillatory movement of said unit in shear, the mounting member of both pairs being spaced laterally from the central vertical plane of said unit so as to participate substantially equally in opposing the torque reaction thereof.

7. A mounting for a power unit including an internal combustion engine; and means for oscillatively mounting said unit about the center of mass of said unit, said means comprising a frame structure, a pair of front mounting members, one interposed between the latter and each side of said unit respectively, and each having a rubber element secured to said frame structure and power unit and constructed and arranged to extend in a plane substantially normal to a line intersecting the center of mass of said unit for accommodating oscillatory movement of said unit mainly in shear, and a pair of rear mounting members, one interposed between said frame structure and each side of said unit respectively and each having a rubber element secured to said frame structure and power unit and constructed and arranged to extend in a plane substantially normal to a line intersecting the center of mass of said unit for accommodating oscillatory movement of said unit in shear, the said rubber elements of each pair of mounting members being spaced laterally substantially equal distances and inclined outwardly in opposite directions from the longitudinal center line of said frame structure and adapted to oppose horizontal transitory movement of said unit by a compressive stress thereof.

ALEX TAUB.